Figure 1:
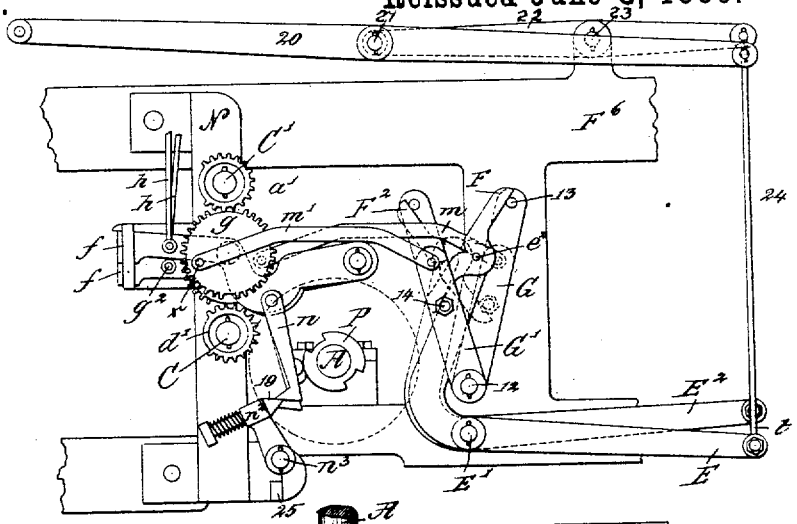

139. TEXTILES, WEAVING.

181

BEST AVAILABLE COPY

3 Sheets—Sheet 1.

G. CROMPTON & H. WYMAN,

Assignors to G. CROMPTON.

MECHANICAL MOVEMENT.

No. 10,735. Reissued June 8, 1886.

Witnesses.

Fred L. Emery

Arthur Zipperlen.

Inventors.

George Crompton

Horace Wyman by Crosby & Gregory Attys.

N. PETERS, Photo-Lithographer, Washington, D. C.

3 Sheets—Sheet 2.

G. CROMPTON & H. WYMAN,

Assignors to G. CROMPTON.

MECHANICAL MOVEMENT.

No. 10,735. Reissued June 8, 1886.

Witnesses.
Fred L. Emery
Arthur Zipperlen.

Inventors.
George Crompton
Horace Wyman.
by Crosby & Gregory Attys.

N. PETERS, Photo-Lithographer, Washington, D. C.

G. CROMPTON & H. WYMAN,

Assignors to G. CROMPTON.

MECHANICAL MOVEMENT.

No. 10,735. Reissued June 8, 1886.

Witnesses.
Fred L. Emery
Arthur Zipperlen.

Inventors.
George Crompton,
Horace Wyman
by Crosby & Gregory attys.

N. PETERS, Photo-Lithographer, Washington, D. C.

UNITED STATES PATENT OFFICE.

GEORGE CROMPTON AND HORACE WYMAN, OF WORCESTER, MASSACHUSETTS, ASSIGNORS TO GEORGE CROMPTON, OF SAME PLACE.

MECHANICAL MOVEMENT.

SPECIFICATION forming part of Reissued Letters Patent No. 10,735, dated June 8, 1886.

Original No. 336,623, dated February 23, 1886. Application for reissue filed March 25, 1886. Serial No. 196,585.

*To all whom it may concern:*

Be it known that we, GEORGE CROMPTON and HORACE WYMAN, of Worcester, county of Worcester and State of Massachusetts, have invented an Improvement in Mechanical Movements, of which the following description, in connection with the accompanying drawings, is a specification, like letters on the drawings representing like parts.

This present invention is an improvement upon that described in United States Letters Patent No. 281,842, to which reference may be had, and has for its object to increase the number of steps or dwells in the movement of the parts between their extreme positions; also to insure a greater range of movement than therein provided for.

In the patent referred to a main lever, having a secondary lever pivoted upon it and actuated by two stud-carriers, was so moved that its front end might be made to occupy any one of four different positions, the said main lever thus moving a rod connected therewith over three steps from the highest or lowest position occupied by the said lever. Desiring to increase the range of a mechanical movement of the class therein shown, we first duplicated some of the parts shown in the said patent, thus providing a main lever and an auxiliary main lever; and we have joined the connecting-rod attached to the longer arm of the main lever directly with one end of a prime lever having its fulcrum on a fulcrum-carrying lever mounted on, as herein shown, a fixed stud, the latter lever being in turn actuated at one end by a suitable connecting-rod attached to the auxiliary main lever, as will be described. By moving the main lever and the auxiliary main lever for the proper distance in the same direction in unison or in opposition to each other for a greater or less extent we have been able to gain for the mechanism so made a very much greater range of motion, as well as increase in the number of steps of the movement, and whereby we have gained several additional distinct positions of rest for the mechanism between extreme positions thereof, as will be described.

Figure 2:
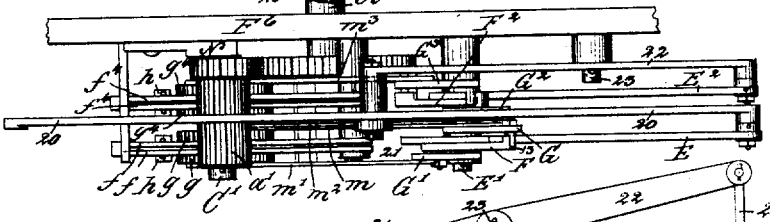
Figure 3:
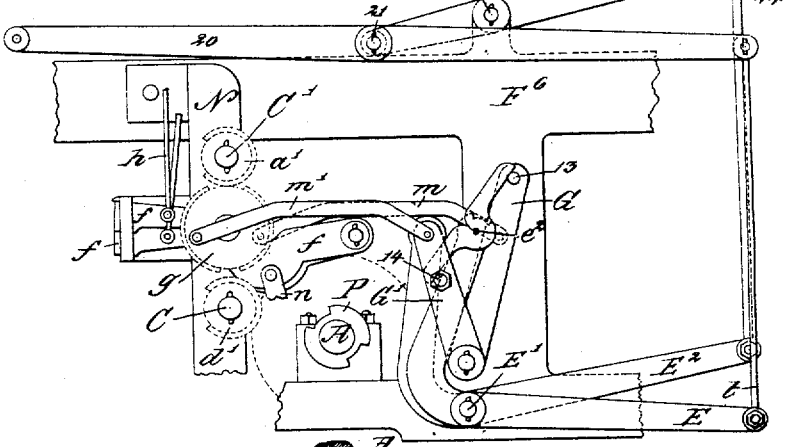
Figure 4:
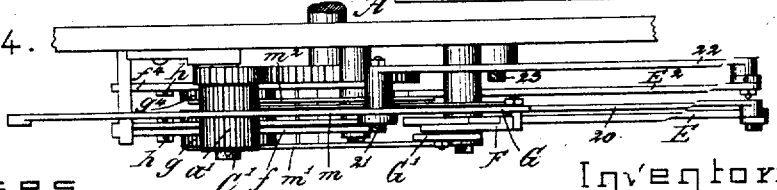
Figure 5:
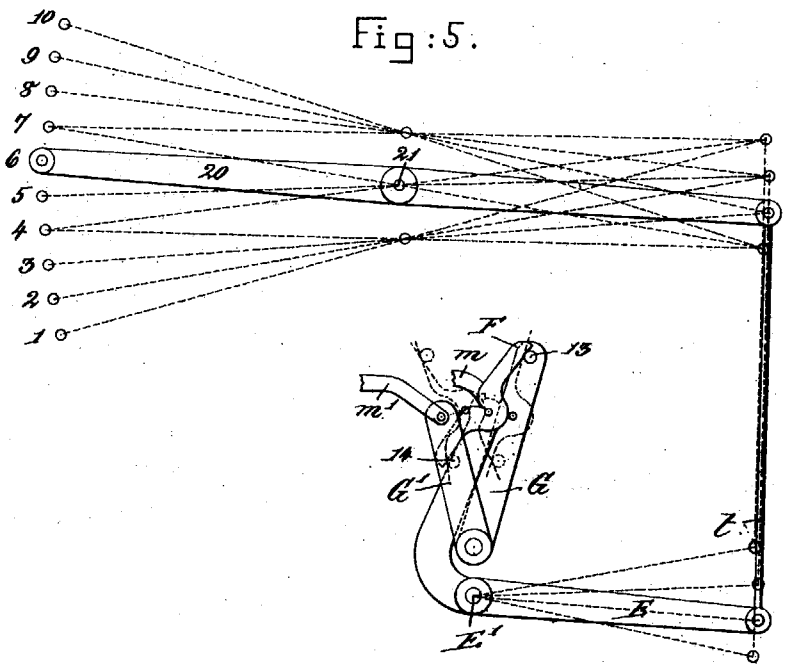
Figure 6:
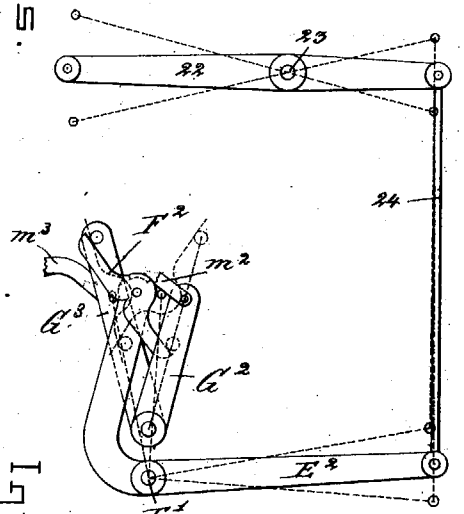
Figure 7:
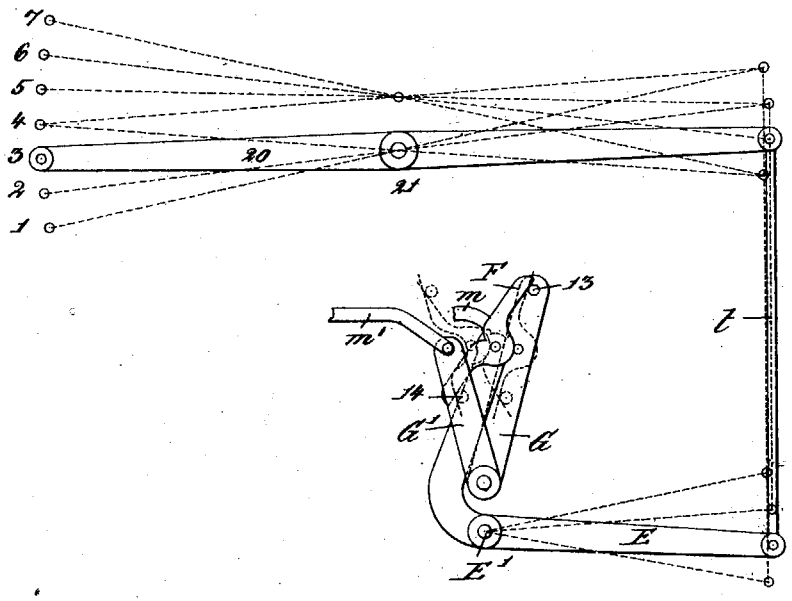
Figure 8:
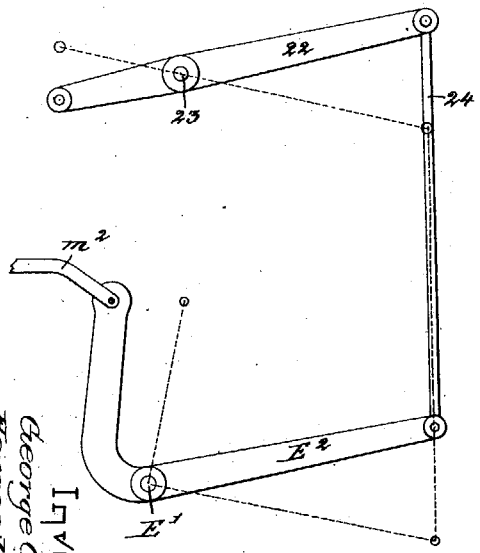

Figure 1 of the drawings represents a mechanical movement embodying our present improvements, the same being adapted to insure ten distinct positions or steps for the end of the prime lever therein shown; Fig. 2, a top view thereof. Fig. 3 is a side view of a modification to effect but seven different positions or steps, part of the mechanism being broken away. Fig. 4 is a top or plan view thereof. Fig. 5 is a diagram to illustrate the different positions of the prime lever, the said figure showing the prime lever and the connected main and secondary levers and some of the parts used in moving the said main and secondary levers; Fig. 6, a similar diagram showing different positions of the fulcrum-carrying lever, the connected auxiliary main lever and secondary lever and some of the parts employed to move the latter. Fig. 7 is a diagram showing the prime lever as it will appear when moved to occupy seven positions, the said figure showing a connected auxiliary lever and a secondary lever and some of the parts to move them and the said prime lever; and Fig. 8 shows the fulcrum-carrying lever which will be employed when the prime lever is not to be moved for more than seven spaces, the said figure showing the lever and connecting-rod to be employed therewith, and to be hereinafter described.

In this present invention parts like those employed in the said patent are designated by like letters—as, for instance, the studs C C′, long partial gears $a'$ $d'$, toothed cranks $g$, actuated by them, crank-pins $x$, vibrators $f$, to carry the said toothed cranks, connectors $h$, connecting-rods $m$ $m'$, the pivoted stud-carriers G G′, having studs 13 14, the main lever E, pivoted at E′, and the attached secondary lever F, pivoted thereto at $e^2$, substantially at its center.

In accordance with our present invention some of the parts mentioned are duplicated, and such parts will be briefly referred to by proper letters.

The frame $F^6$, the shaft A, cam P, latches $n$, holder $n^2$, and the devices for moving them and the long partial gears and the vibrators in the proper order are and may be as in the said patent.

In Figs. 1 and 2 and 6 we have shown an auxiliary main lever, $E^2$, like that marked E, and have provided it with a lever, $F^2$, like that marked F, and have provided auxiliary stud-carriers $G^2$ $G^3$, like those marked G G′ in the said patent, and the said stud-carriers $G^2$ $G^3$ have connected with them and are vibrated by means of connecting-rods $m^2$ $m^3$, joined with the crank-pins of other toothed cranks, $g^4$ $g^4$, on other vibrators, $f^4$ $f^4$, attached to suitable connections moved as are the connectors *h*. The lever E is joined by connecting-rod *t* with the end of a prime lever, 20, pivoted near its middle upon a pin or fulcrum, 21, at the end of a fulcrum-carrying lever, 22, mounted upon a fulcrum, 23, shown as a stud fixed to the frame-work, $F^6$, the latter being of any usual or suitable shape, the other end of the said lever 22 being connected by rod 24 with the end of the auxiliary main lever $E^2$.

In the accompanying drawings the auxiliary main lever $E^2$ is shown in the diagram represented in Fig. 6 as placed in but three of its positions, the pattern-surface controlling the time of operation of the toothed cranks $g^4$ being supposed to be arranged in such sequence as to place the outer end of the said lever in but three of the steps which it may occupy; but the lever E is drawn to show four positions, and so it will be understood that the said lever $E^2$, as well as the lever E, may occupy any one of four positions, thus increasing the steps above those represented by the diagrams Figs. 5 and 6.

The movements imparted to each of the two levers E and $E^2$ by the toothed cranks being made to engage at the proper intervals with the partial gears *a′ d′* being understood, the lever $E^2$ being adapted to be moved so as to place its end in any one of three positions, and the end of lever E being adapted to be placed in any one of four different positions at will in accordance with the indications of a pattern-surface, it will be seen that the said levers E $E^2$, through the connecting-rods described, attached to them and to the ends of the levers 20 and 22 of different length, may be made to move the lever 22 into three different positions, and in each of the said three positions thereof the fulcrum-pin 21 may be held while the prime lever 20 is moved thereon to make its end occupy any one of four different positions; but as two of the twelve positions which the free end of the lever 20 may thus be made to occupy are occupied twice by the free end of the said lever 20 as it is moved on the fulcrum-pin 21 in its different positions, it results that the end of the said lever does not really occupy but ten different or distinct positions from one to the other end of its traverse.

In the drawings, as stated, the diagram Fig. 6 shows but three positions for the lever $E^2$; but should it be made to occupy four different positions, as might easily be done by giving to the stud-carriers $G^2$ $G^3$ the proper relative movements, then the lever 22 would also have, as shown, four different positions, and in such event, should the prime lever 20 be turned on the fulcrum 21 to occupy four different positions in each of the four positions of the said fulcrum-pin, sixteen different positions would be insured; but as three of the resulting sixteen changes would represent common points the outer end of the lever 20 would actually be made to occupy but thirteen different positions, counting its extreme positions and those between them. These different movements and positions and their possibilities will be readily seen by a mechanician when inspecting the drawings.

In Figs. 3, 4, 7, and 8 the lever $E^2$ is supposed to be moved so as to occupy but two positions, and consequently it may be attached directly to one of the connecting-rods of a toothed crank, $g^4$, such as described, and the latter be partially rotated at the proper times by the partial gears *a′ d′* in the manner common to the said patent, and consequently the lever 22, moved by it, can occupy but two positions; but as the prime lever 20 may be made to occupy any one of four positions, as described on the fulcrum 21, it results, owing to one common point, that the free end of lever 20 really occupies seven positions or steps, which is three more than possible with only the mechanism shown in our said patent.

The combination of the prime lever, the fulcrum-supporting lever, and the auxiliary main lever and actuating devices therefor with the mechanism shown in the said patent greatly increases the number of movements which may be produced, and is a matter of great convenience when irregular reciprocating movements of different length are to be produced.

By the devices shown the free end of the lever 20 may be carried from any one of the positions numbered, respectively, in Fig. 5 1 to 10 to any other one of such positions, as will be understood.

We claim—

1. The main lever, a secondary lever fulcrumed thereon, toothed cranks, means, substantially as described, for connecting the said cranks and secondary lever, and means for actuating the said cranks, combined with the prime lever, the fulcrum-lever on which it is pivoted, and actuating mechanism for the fulcrum-lever, and means to connect the main lever to the prime lever, substantially as set forth.

2. The main lever, a secondary lever mounted thereon, an auxiliary main lever, toothed cranks, and means to partially rotate them, and mechanism, substantially as described, interposed between said cranks and levers to operate them, combined with the prime lever, the fulcrum-carrying lever on which the prime lever is mounted to turn, and means to connect the prime and fulcrum-carrying levers, respectively, with the main and auxiliary main levers, substantially as described.

3. The prime lever, main lever, a co-operating secondary lever, and means to operatively connect the said levers and gearing, substantially as described, to effect the movement of the secondary lever and its connected parts, combined with the fulcrum-carrying lever on which the prime lever is pivoted, and with means, substantially as described, to place the fulcrum-carrying lever in at least two different positions and retain it at rest while the free end of the prime lever is put into more than two positions, substantially as described.

GEO. CROMPTON.
HORACE WYMAN.

Witnesses:
J. B. SYME,
JUSTIN A. WARE.